Patented Aug. 25, 1936

2,052,195

UNITED STATES PATENT OFFICE 2,052,195

PRODUCTION OF OXYGENATED ORGANIC COMPOUNDS FROM OLEFINS

Helmuth G. Schneider and Julius V. Sommer, Elizabeth, N. J., assignors to Standard Oil Development Company, a corporation of Delaware No Drawing. Application August 24, 1932, Serial No. 630,250

21 Claims. (Cl. 260—116)

This application relates to the manufacture of oxygenated organic compounds by reaction of olefin hydrocarbons with oxygen. The conditions heretofore used for the oxidation of olefins and the preparation of oxygenated products therefrom have involved the use of relatively high temperatures at which it is necessary to carefully limit the oxygen admitted to contact with the olefin to an amount insufficient for complete combustion. Under such conditions the formation of highly polymerized gummy and resinous products and the subsequent oxidation of the originally formed oxygenated products, are distinct disadvantages.

According to the present invention olefin hydrocarbons are contacted with gases containing free oxygen at relatively low temperatures at which the reaction proceeds smoothly without local overheating or danger of undue rise of temperature and without appreciable polymerization or decomposition of either the initial olefins or the oxygenated products.

The following examples illustrate conditions suitable for the process herein described:

Example 1

Pure cyclohexene, having the following characteristics,

Specific gravity_____ 0.8189 (60/60° F.)
Refractive index_____ 1.4488 at 20° C.

was placed in a glass bottle which was placed upright in a steel bomb. The bomb was immersed in a steam bath at 100° C. and was subjected to an internal pressure of 110 pounds gauge with air. After 117 hours the bomb was opened and a liquid of 0.9268 specific gravity and 1.4690 refractive index was obtained in a volumetric yield of 88%. This liquid was distilled at 10 mm. absolute pressure to a bottoms temperature of 105° F. and the following fractions were obtained:

Percent by volume
Distillate _____ 54.4
  Specific gravity 0.8285
  Refractive index 1.4498
Bottoms_____ 43.1
  Specific gravity 1.0528
  Refractive index 1.4942
Distillation loss_____ 2.5

The distillate was mainly unreacted cyclohexene while the bottoms consisted of oxygenated products. The crude oxygenated products showed strong peroxide and acid reactions and gave a weak Schiff's test for aldehydes.

Saponification of a portion of the bottoms from this distillation indicated that the product contained 25 to 30% of free acid and ester. The ratio of ester to free acid was approximately 10 to 1. Attempted crystallization of the ammonium, calcium, barium and copper salts of these acids yielded only viscous tarry masses which could not be crystallized. These acids therefore appear to be unsaturated and hydroxy acids. The oxygenated product (bottoms) was distilled at 10 mm. pressure. Products obtained were (1) an oil boiling at 57 to 59° C., (2) a white crystalline solid subliming at 100 to 110° C., (3) a residue normally bright red in color which on cooling turns to a viscous oil or a glassy mass. The oil fraction boiling at 57 to 59° C. (fraction 1) was identified as delta 2 cyclohexenol. The solid sublimate after repeated recrystallization from toluene melted at 102 to 103.5° C. and was identified as cis cyclohexene glycol.

To summarize, a number of runs under the same conditions shown above yielded the following average products:

| Product | Yield |
|---|---|
| | Percent |
| Unsaturated alcohol | 30 to 40 |
| Olefine oxide | 10 to 20 |
| Glycol | 10 to 20 |
| Acids and esters | 25 to 30 |
| Resins | 0 to 5 |

The above yields are expressed on a molal basis, based on the initial olefine reacted.

The effect of time of continued oxidation on the yield of oxygenated products is shown in the results of the following runs which were conducted under the same conditions used in Example 1, but for shorter periods of time:

| Example | Time (hours) | Yield of oxygenated products (% by volume) |
|---|---|---|
| 2 | 70 | 32 |
| 3 | 48 | 23 |
| 4 | 24 | 11 |

Example 5

Pure hexylene was subjected to contact with air under the same conditions shown in Example 1. After 112 hours the product was withdrawn from the bomb and was neutralized with aqueous sodium hydroxide. The resulting oil layer was distilled and the following fractions were obtained separately:

| | Fraction |
|---|---|
| Hexylene | below 80° C. |
| Hexylene oxide (B. P. 110° C.) } Unsaturated alcohol (B. P. 137° C.) } | 100–160° C. |
| Glycol (B. P. 200° C.) | 160–205° C. |
| Ester } Resin } | Residue |

Glycol was also isolated from the aqueous layer by distilling off the water with benzol.

28% of the total hexylene used was converted in the reaction and yielded the following products:

| Product | Yield mol percent on hexylene reacting |
|---|---|
| | Percent |
| Total acid | 22.2 |
| Glycol | 8.2 |
| Unsaturated alcohol and oxide | 48.6 |
| Alcohol combined as ester | 13.9 |

The oxygenated derivatives of the hexylene were similar to those obtained in Example 1 from cyclohexylene.

*Example 6*

Hexylene was subjected to contact with air under the same conditions used in Example 1 but with the addition of an excess of calcium hydroxide and in the presence of a small amount of water. After 112 hours 21% of the hexylene was converted into oxygenated products as follows:

| Product | Yield mol percent on hexylene |
|---|---|
| | Percent |
| Total acid | 60.8 |
| Unsaturated alcohol } Olefin oxide } | 77.3 |
| Glycol | 15 |

The oxygenated reaction product contained no esters. The acids were obtained in the form of their calcium soaps and were liberated with dilute mineral acid. The calcium hydroxide neutralized the acids as formed and resulted in an increased yield of the olefin oxide.

*Example 7*

A fraction of a cracked petroleum naphtha corresponding to the hexane and heptane fraction, 95% distilling over at 95° C., (end point below 100° C.) obtained from the cracking of gas oil at 750 pounds pressure, was charged into an aluminum bomb which was loosely packed with aluminum turnings. The amount charged was 2000 cc. of which 35% were olefins. The bomb was placed in a steam bath at 100° C. and was subjected to internal pressure of 100 pounds with air. Air was passed through the bomb, being admitted below the surface of the liquid, at an average rate of 40 liters per hour for 26 hours. The oxygen absorption efficiency was constant at 90% for approximately half the run and then gradually dropped off to about 50%. The reaction products were worked up in the manner described in Example 5 and were found to be of substantially the same composition. A total yield of 43.5% of oxygenated products based on the total olefin in the original cracked naphtha fraction was obtained. No oxidation was secured with hexane or with benzene under the same conditions.

As shown in the above examples, the reaction rate may be greatly increased by forcing air through the liquid olefin. The reaction time may accordingly be shortened materially by the use of higher gas rates if adequate provision is made for preventing entrainment. It is desirable to cool the gases leaving the reactor and to return the liquid condensate thereby obtained to the reaction zone.

In explanation of the above results it may be assumed that the olefin first reacts with one molecule of oxygen to form the peroxide. The peroxide is stable at low temperatures but under the conditions of the oxidation decomposes into an acid and an active oxygen atom. This oxygen atom then reacts with additional olefin to form an olefin oxide or also, with cyclohexene, to yield benzol and water. Other substances such as anthracene if present may also be oxidized. The olefin oxide is stable in the absence of acid and may be obtained in larger yields if the oxidation is conducted in the presence of an antiacid substance capable of neutralizing the acids as formed. In the absence of such a neutralizing agent the oxide partially reacts with the acid to form an ester or combines with any water present to form the glycol. The ester is then partially converted into an acid and an unsaturated alcohol of the same number of carbon atoms as the original olefin. There is substantially no secondary oxidation of the originally formed oxygenated products in the herein described process.

The intermediate formation of peroxide is substantiated by the following example:

*Example 8*

Air was forced at 2000 pounds pressure through cyclohexene maintained at 53 to 58° C. for 72 hours. There was obtained a yield of 44% of oxygenated products based on the cyclohexene used. The product contained much larger quantities of peroxides than did the products of the above experiments. This product decomposed violently on heating.

The actively oxidizing characteristics of the formed peroxides may also be used to advantage in preparing oxygenated products of other more difficultly oxidizable substances simultaneously with the oxidation of the olefines.

*Example 9*

The process described in Example 1 was repeated with the exception that 50% by weight of anthracene based on the cyclohexene was added to the bomb before the start of the oxidation. Substantially the same yield of products of the same composition as obtained in Example 1 was obtained from the cyclohexene while in addition the anthracene was almost quantitatively oxidized to anthraquinone.

Under the same operating conditions, but in the absence of olefine, no oxidation of the anthracene occurred.

Iron, copper and other metals corroded by the oxidation products are undesirable as these metals cause polymerization. It is accordingly preferred to conduct the oxidation in the absence of such metals and in the presence of substantially inert materials such as glass, silica, porcelain and aluminum.

Suitable antiacid compounds for neutralizing the acids formed and aiding the production of olefine oxides are the alkaline earth hydroxides. The alkalis may cause gumming and are less desirable. Other mildly basic compounds such as heavy metal hydroxides may be used or the alkaline earth and more mildly basic oxides may be used with added water. Any substance capable of neutralizing the acids formed with the formation of products substantially stable under the reaction conditions are suitable. The process may be used to advantage for the direct production of metallic driers suitable for use in paints and the like if the oxygenation is conducted in the presence of basic compounds of suitable metals such as lead, cobalt or manganese.

In addition to the oxidation of anthracene shown above, the process may also be used for oxidizing other relatively difficultly oxidizable substances such as sulfur dioxide, aldehydes, sulfites, camphene, various dye bases and the like.

The herein described process is also suitable in all the variations above disclosed for the production of corresponding products from other types of olefines. Amylene, hexylene, heptylene, octylene and the like may be treated either alone or in admixture with each other or with other olefins and with saturated hydrocarbons. Olefinic products formed on cracking hydrocarbon oils may be treated directly or the olefines contained therein may be separately removed or concentrated by selective extraction or other suitable means and then subjected to the oxidation process. Especially suitable stocks are those obtained by cracking paraffin wax or other petroleum fractions such as lubricating oil stocks, gas oils, kerosenes, naphthas and the like.

While this process may be applied under suitable modification to substantially all olefins, it is especially suitable for those containing between about 4 and 12 carbon atoms per molecule, since it is preferable that the olefines are substantially completely in liquid phase during the oxidation process. Cracked naphthas or olefins obtained therefrom boiling up to about 250° C. are also suitable, especially when obtained by cracking paraffin wax.

The oxidation temperature is preferably below such temperature as will cause substantial decomposition, polymerization, or secondary and uncontrolled oxidation of the reagents or products, say below about 150° C. The use of elevated pressure is desirable especially at lower temperatures to increase the rate of reaction, and pressures of about 5 atmospheres or higher are generally used at reaction temperatures of 80 to 120° C., although higher or lower pressures may be used. Pressures of the order of 5 to 200 atmospheres and temperatures of about 70 to 40° C. or lower are preferred where it is desired to obtain products containing a substantial concentration of peroxides. The reaction temperature in such case should be so low as to avoid decomposition of the peroxides.

In the appended claims, the term "oxygen" is intended to mean gases containing free (molecular) oxygen.

This invention is not to be limited to any examples or theories of the mechanism of our process, which are given solely for purpose of illustration and explanation, but only by the following claims, in which we wish to claim all novelty insofar as the prior art permits.

We claim:

1. Process for the production of oxygenated organic compounds comprising oxidizing substantially in liquid phase an olefine-containing product derived by cracking hydrocarbons, said oxidation being effected by a gas containing free oxygen in the absence of ozone at a temperature between the approximate limits of 40 and 150° C. and at a pressure between the approximate limits of 5 and 200 atmospheres.

2. Process for oxidizing difficultly oxidizable chemical compounds, which comprises admixing said substances with olefinic hydrocarbons substantially in liquid phase and oxidizing the mixture with a gas containing free oxygen at a temperature between the approximate limits of 40 and 150° C. and at a pressure between the approximate limits of 5 and 200 atmospheres.

3. Process for the production of oxygenated organic compounds comprising reacting an olefine hydrocarbon with oxygen at superatmospheric pressure and at a reaction temperature between the approximate limits of 40 and 150° C. and at a pressure between the approximate limits of 5 and 200 atmospheres.

4. Process for the production of oxygenated organic compounds comprising reacting an olefine hydrocarbon of not more than 12 carbon atoms substantially in liquid phase with a gas containing free oxygen at a temperature between 80 and 120° C. and a pressure between the approximate limits of 5 and 200 atmospheres.

5. Process for the production of oxygenated organic compounds comprising olefine oxides, glycols, alcohols, acids and esters, which comprises subjecting a normally liquid olefine hydrocarbon of not more than 12 carbon atoms to contact in liquid phase with gaseous oxygen at a temperature between the approximate limits of 80 and 120° C. and at a pressure between the approximate limits of 5 and 200 atmospheres.

6. Process for the production of oxygenated organic compounds comprising olefine oxides, glycols, alcohols, acids and esters, which comprises bringing a normally liquid olefine hydrocarbon into contact in liquid phase with oxygen in excess at a reaction temperature between the approximate limits of 40 and 120° C., a pressure between the approximate limits of 5 and 200 atmospheres and for an extended period of time.

7. Process according to claim 6 in which the olefine hydrocarbon comprises a non-cyclic olefine containing from 4 to 12 carbon atoms.

8. Process according to claim 6 in which the olefine hydrocarbon comprises a liquid mixture of olefines boiling below 100° C. and obtained by cracking a relatively higher molecular weight hydrocarbon oil.

9. Process according to claim 6 in which the olefine hydrocarbon comprises a liquid mixture of olefines boiling below about 250° C. and obtained by cracking higher molecular weight hydrocarbons.

10. Process for the production from normally liquid olefine of oxygenated organic compounds comprising a substantial proportion of organic peroxide corresponding to said olefine which comprises bringing said olefine into contact in liquid phase with gaseous oxygen at a pressure between the approximate limits of 5 and 200 atmospheres and at a temperature between the approximate limits of 40 and 70° C.

11. Process for the production of oxygenated organic compounds comprising olefine oxide, alcohol, glycol and acids which comprises bringing a normally liquid olefine hydrocarbon into contact in liquid phase with oxygen in excess at a reaction temperature between the approximate limits of 40 and 150° C. and at a pressure between the approximate limits of 5 and 200 atmospheres in the presence of an antiacid substance capable of forming with said acid a compound stable under the reaction conditions.

12. Process according to claim 11 in which the antiacid substance comprises a basic metal compound.

13. Process according to claim 11 in which the antiacid substance comprises alkaline earth hydroxide.

14. Process according to claim 11 in which the antiacid substance comprises an alkaline earth oxide and the reaction is conducted in the presence of added water.

15. Process for the production of oxygenated organic compounds rich in peroxides which comprises reacting olefines with oxygen in the absence of ozone at a temperature of approximately 40 to 70° C. and at a pressure between the approximate limits of 5 and 200 atmospheres.

16. Process according to claim 3, in which a difficultly oxidizable substance is added and is thereby oxidized simultaneously with the olefine.

17. As a new product, a mixture of oxygenated organic compounds obtainable by reacting olefines in liquid phase with oxygen in the absence of ozone and catalytic substances at a reaction temperature between the approximate limits of 40 and 150° C. and at a pressure between the approximate limits of 5 and 200 atmospheres.

18. As a new product, a mixture of oxygenated organic compounds obtainable by reacting olefines with oxygen at a temperature between 80 and 120° C. and at a pressure between the approximate limits of 5 and 200 atmospheres.

19. As a new product, a mixture of oxygenated organic compounds rich in peroxides obtainable by reacting olefines in liquid phase with oxygen at a temperature between the approximate limits of 40 and 70° C. and at a pressure between the approximate limits of 5 and 200 atmospheres.

20. As a new product, a mixture of oxygenated organic compounds rich in olefine oxides, obtainable by reacting olefines with oxygen in the presence of an inorganic basic compound at a temperature between the approximate limits of 40 and 150° C. and at a pressure between the approximate limits of 5 and 200 atmospheres.

21. Process for oxidizing difficultly oxidizable chemical compounds which comprises admixing said compounds with olefinic hydrocarbons substantially in liquid phase and oxidizing the mixture with a gas containing free oxygen at a temperature between the approximate limits of 40 and 150° C. and at a pressure between the approximate limits of 5 and 200 atmospheres.

HELMUTH G. SCHNEIDER.
JULIUS V. SOMMER.